United States Patent [19]
Elliott

[11] 3,965,523
[45] June 29, 1976

[54] BEARING WASHER

[75] Inventor: Jack P. Elliott, Amherst, N.Y.

[73] Assignee: J. P. Elliott Associates, Inc., Buffalo, N.Y.

[22] Filed: Sept. 16, 1974

[21] Appl. No.: 506,311

[52] U.S. Cl. ............................. 15/302; 15/306 B; 134/72; 198/190; 198/204
[51] Int. Cl.² ......................................... A47L 5/38
[58] Field of Search .............. 15/302, 306 R, 306 B; 134/72, 131; 198/37, 190, 204

[56] References Cited
UNITED STATES PATENTS

| 506,184 | 10/1893 | McDonald | 198/190 X |
|---|---|---|---|
| 3,001,636 | 9/1961 | Klapes | 198/204 |
| 3,059,654 | 10/1962 | Weiner | 134/131 X |
| 3,498,303 | 3/1970 | Eaves et al. | 15/302 X |
| 3,802,094 | 4/1974 | Isoda | 198/190 X |

FOREIGN PATENTS OR APPLICATIONS

| 708,483 | 7/1941 | Germany | 15/306 B |
|---|---|---|---|

*Primary Examiner*—Christopher K. Moore
*Attorney, Agent, or Firm*—Christel & Bean

[57] ABSTRACT

A bearing washing machine is provided having a series of cleaning stages through which bearings can be continually processed. The washer includes a conveyor means formed by two variably spaced block chains. The block chains are in driving connection with a motor means and pass underneath a plurality of nozzles, the latter providing in sequence a washing operation, a high pressure air blowoff for removing washing solution from the bearings, and a low pressure air stream providing drying air to the bearings. The block chains are further arranged to have guide rails variably spaced thereabove so that the outer races of bearings of varying thicknesses may be received and conveyed through the aforesaid cleaning operations. In addition, mechanical linkage is provided for adjusting the spacing between the block chains so that the outer races of bearings having different diameters may be processed. The inner races may be of variable face width dimension which may be greater or less than the corresponding dimension of the outer races. However, only bearings having substantially equal diameters and thicknesses can be continuously processed at any one time.

13 Claims, 9 Drawing Figures

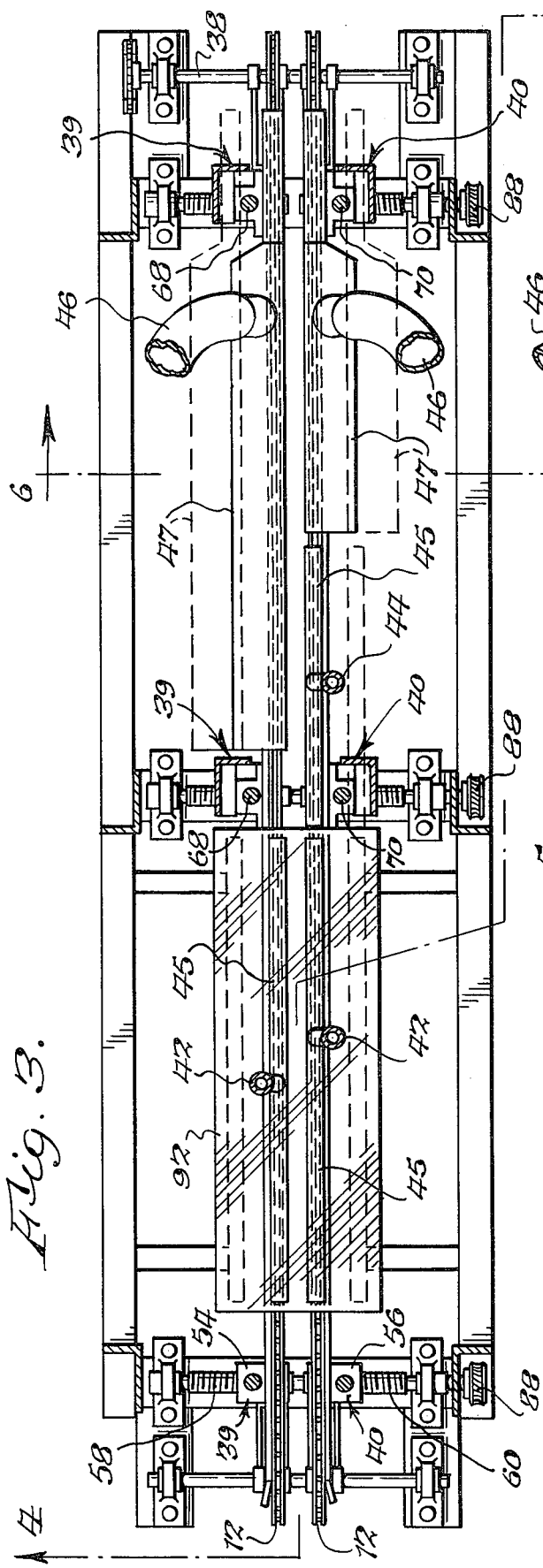
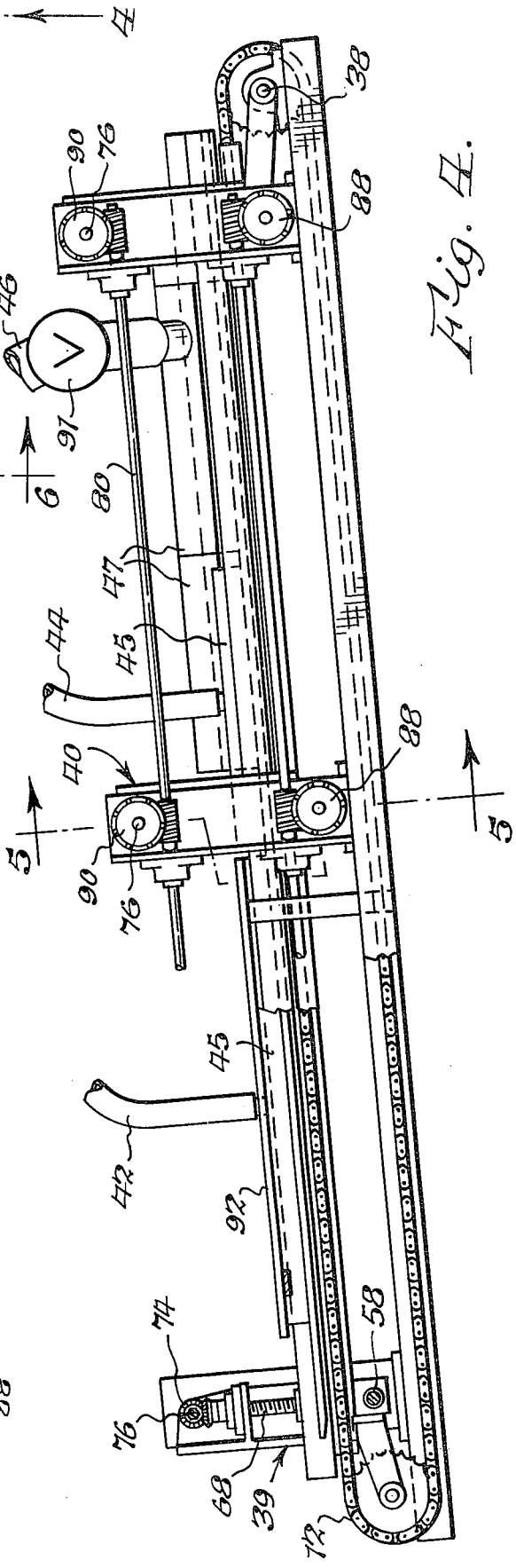
Fig. 3.
Fig. 4.

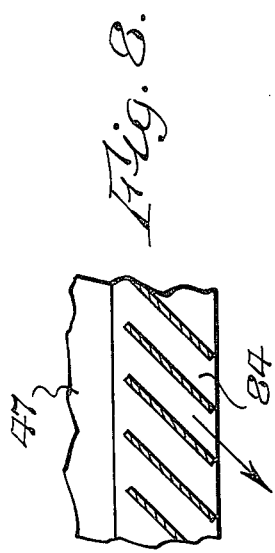
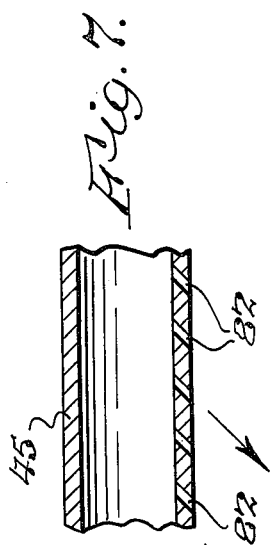
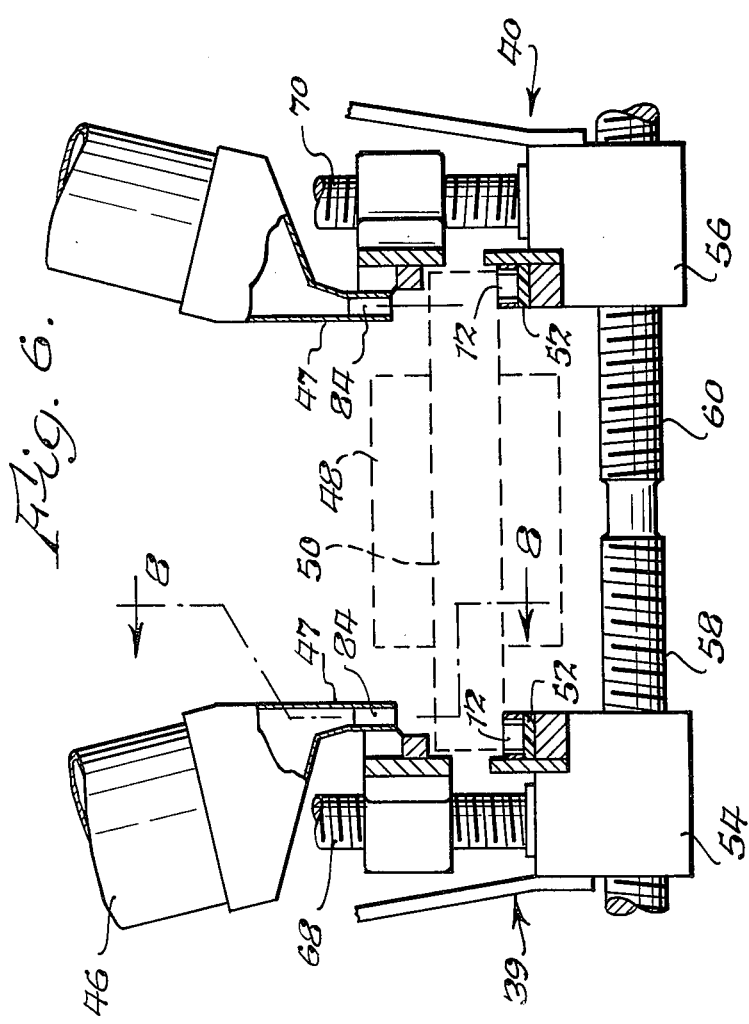
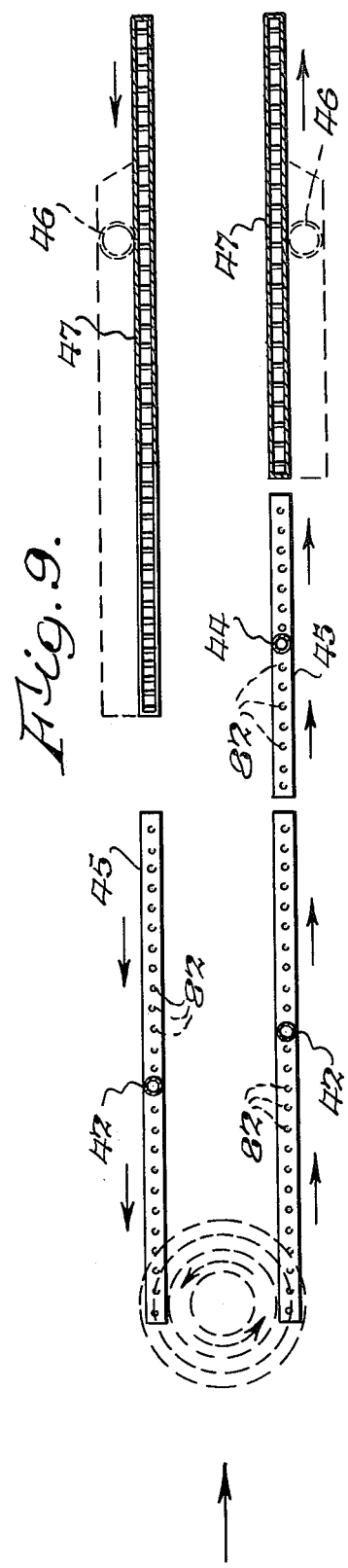

BEARING WASHER

BACKGROUND OF THE INVENTION

This invention relates generally to bearing washing machines, and more particularly to a bearing washing machine which is capable of receiving and processing on a continuous basis bearings having assembled inner and outer races. More specifically, the washing machine includes a sequence of washing, blowoff, and drying sections through which the bearings are systematically conveyed.

The present invention is particularly adapted for those situations in which a substantial number of assembled inner and outer race bearings of uniform dimension are to be washed and cleaned. In such a situation it is highly desirous to minimize the handling of the individual bearings and to minimize the amount of attention required by a user of the washing machine. One of the critical problems encountered in prior art bearing washing machines has been the inability to continuously process a quantity of bearings without interruption. More specifically prior art devices have necessitated placing a discrete quantity of bearings in a washing device which would then be subjected to a washing operation. Such loading and unloading of a washing device necessarily is cumbersome when a user thereof must wait for completion of one "load" before a new load of uncleaned bearings can be cleaned.

SUMMARY OF THE INVENTION

Accordingly, one object of the present invention is to provide a new and improved bearing washing machine which reduces the manual labor which is required for operation of the machine and corresponding cleaning of the bearings.

Another object of the present invention is to provide an improved bearing washing machine capable of receiving and processing bearings on a continuous, uninterrupted basis.

A further object of the present invention is to provide the aforesaid bearing washing machine with a capability of processing bearings of varying diameters and varying thicknesses.

Still another object of the present invention is to provide a bearing washing machine having the aforesaid capability of processing variously sized bearings and in which the adjustments necessary to accommodate such various sizes require a minimum amount of operator time and attention.

A still further object of the present invention is to provide a washing machine which will receive uncleaned bearings and perform a series of cleaning operations resulting in cleaned bearings which do not require any further cleaning procedure and which are dried to the desired degree.

In summary, the present invention provides a ball bearing washing machine having two spaced, parallel block chains which support diametrically opposite, circumferential portions of the outer race of each bearing fed onto the pair of block chains. Both block chains are of the endless type which are driven by a motor and convey each bearing past a plurality of fluid nozzles which in turn provide a washing operation, a high pressure air blowoff of washing solution and dissolved impurities, and a low pressure drying air section. In this manner, ball bearings can be continuously fed onto the input end of the block chains and removed at the output end of the block chains after the bearings have been conveyed through the aforesaid cleaning operation. In addition, the washing machine includes mechanical apparatus for varying both the diameters and thicknesses of bearings which can be processed.

The foregoing and other objects, advantages and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 3 is a sectional top plan view of the block chain conveyor means as indicated in FIG. 1;

FIG. 4 is a detailed side elevational view partially in section of the block chain conveyor means as indicated in FIG. 3;

FIG. 6 is a sectional transverse view of the block chain conveyor means and low pressure drying air nozzles as indicated in FIG. 3;

FIG. 7 is a fragmentary longitudinal view in section of a high pressure air nozzle means as indicated in FIG. 5;

FIG. 8 is a fragmentary longitudinal view in section of the low pressure drying air nozzle means as indicated in FIG. 6; and FIG. 9 is a diagrammatic top view of the nozzles forming the washing section, high pressure air blowoff section, and drying section of the washing machine. In addition, the relative orientation of the nozzles is indicated with respect to imparting rotation to each inner race which passes by the various nozzles.

DETAILED DESCRIPTION OF A PREFERRED EMBODIMENT

Figure 1:
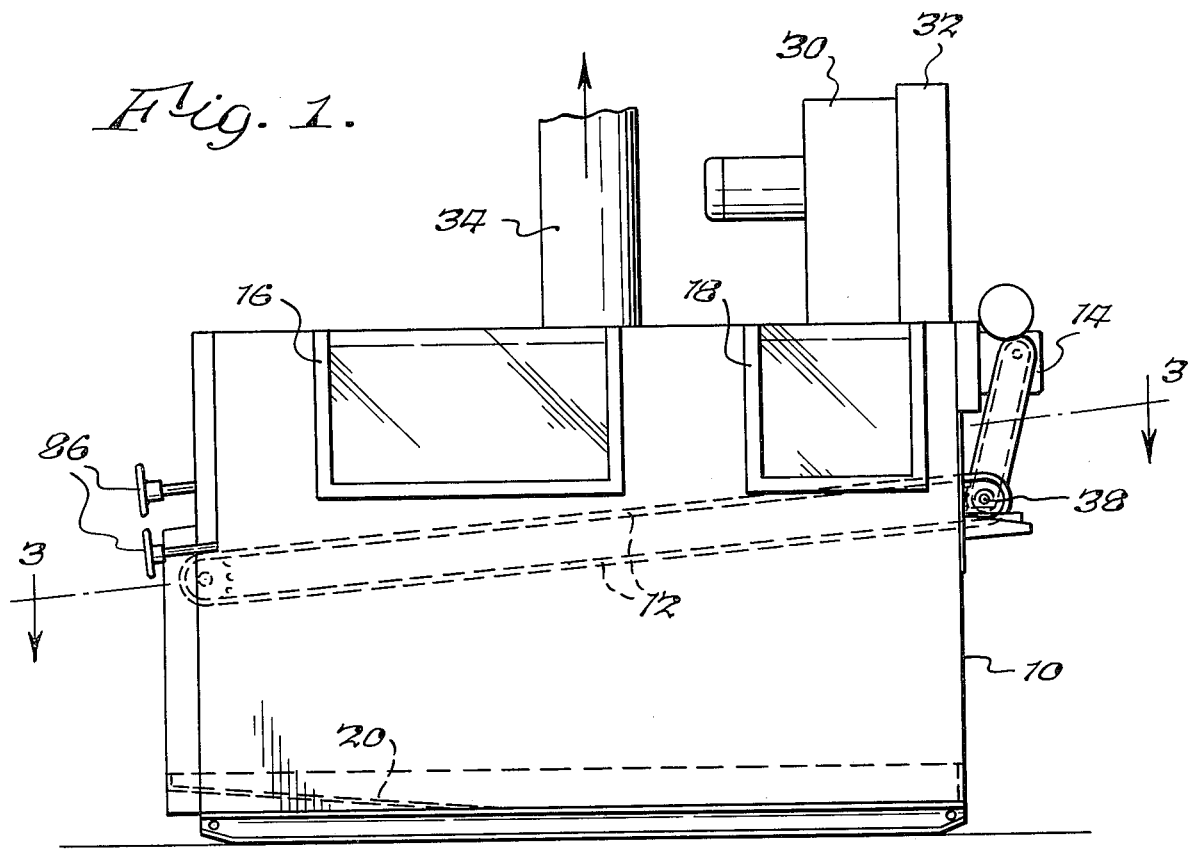
FIG. 1 is a side elevational view of a bearing washing machine as embodied in this invention.
Figure 2:
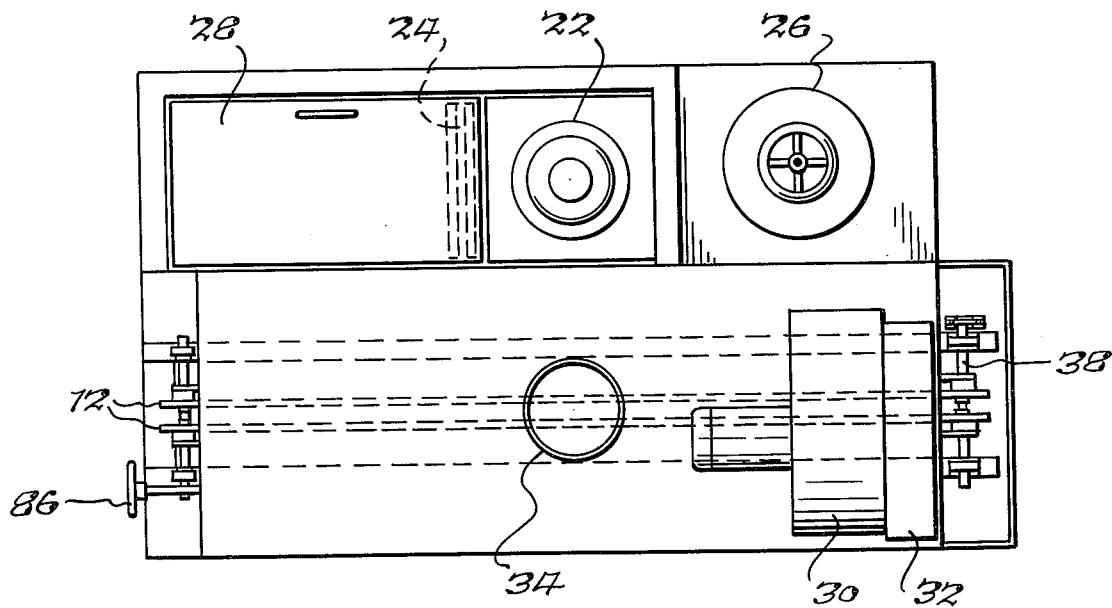
FIG. 2 is a top plan view of the bearing washing machine shown in FIG. 1.

Referring now in detail to the illustrative embodiment depicted in the accompanying drawings, there is shown in FIG. 1 a bearing washing machine having a housing generally designated 10 and a conveyor means sloping upwardly to the right therein and indicated as 12. Conveyor means 12 is in driving connection with a conveyor drive means 14. The washing machine further includes windows 16 and 18 for viewing the cleaning of the bearings carried by the conveyor means 12. The bottom of the washing machine includes a sump pan 20 for collecting washing solution which is sprayed onto the bearings supported on the conveyor means. As seen in FIG. 2, the washing machine includes a pump 22 for circulating washing solution through the machine. During such circulation, the washing solution passes through a plurality of screens 24 and a liquid filter 26. Any washing medium compatible with the intended operation may be used. In addition an access door 28 is provided for access to the screens and associated apparatus therein.

As further shown in FIG. 1, the machine includes a low pressure air blow 30 and associated filter 32. Blower 30 provides the air utilized in the drying section of the washing machine as will be more fully described hereinbelow. Duct 34 provides an exhaust for fumes, the low pressure drying air, and the high pressure blow-off air, the latter also to be more fully described hereinbelow.

As seen in FIG. 3 of the drawings, the conveyor means 12 comprises two spaced, substantially parallel block chains which are both similarly mounted on shafts 36 and 38. In addition, the block chains are each supported at three points along their respective lengths by conveyor mounts 39 and 40. Each mount is shown as including three portions proportionately spaced along the chains and which include the capability of varying the horizontal spacing between the two chains as seen in FIG. 3. As viewed in FIGS. 3 and 4, bearings to be cleaned are conveyed from left to right and sequentially pass under a plurality of washing solution nozzles supplied by lines 42, a plurality of high pressure air blowoff nozzles supplied by lines 44, and a plurality of low pressure drying air nozzles supplied by lines 46. A splash guard 92 of transparent material is positioned over the washing solution nozzles to protect the viewing window 16 against splattering.

Figure 5:
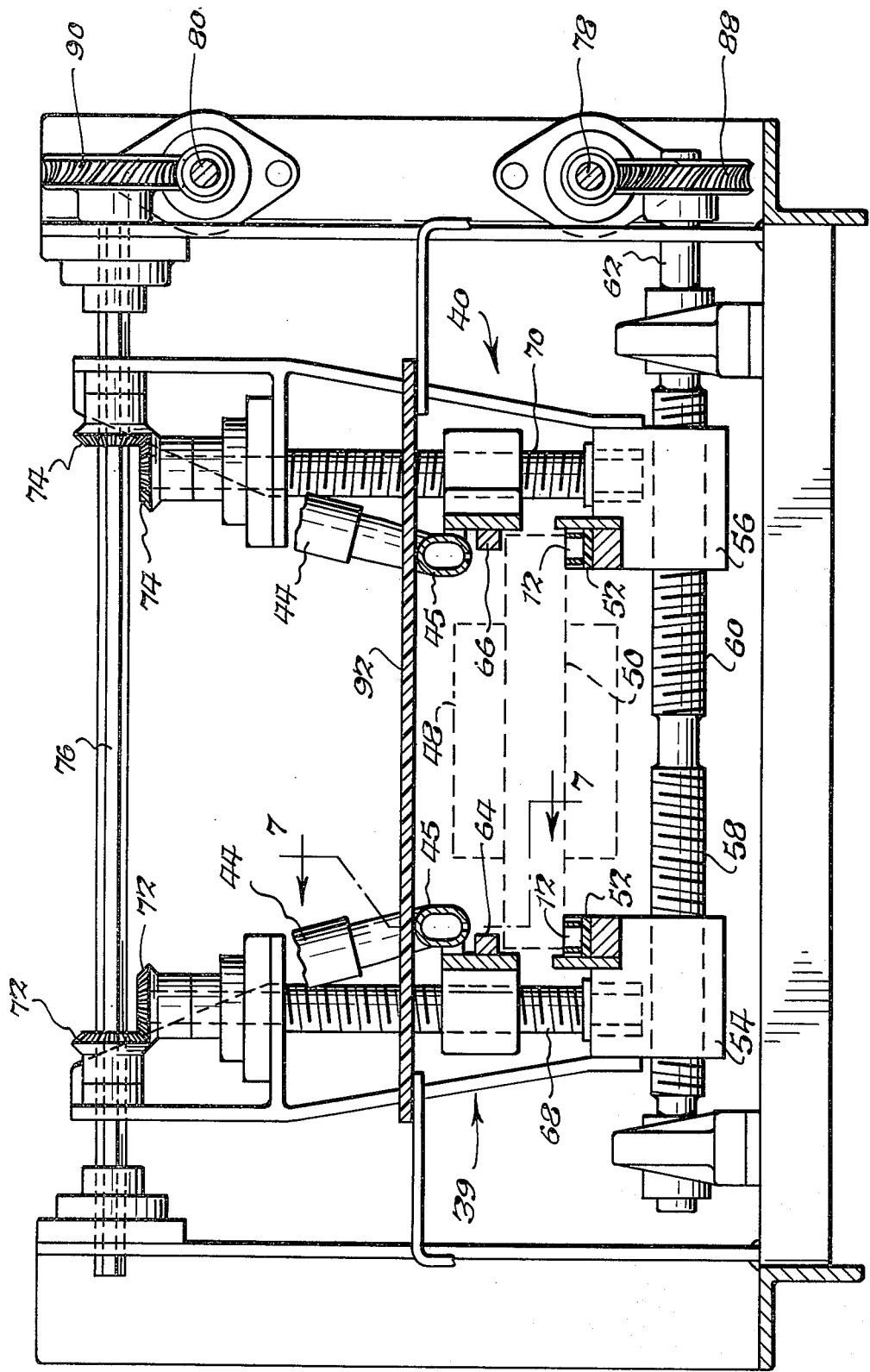
FIG. 5 is a sectional transverse view of the block chain conveyor means and the high pressure air blowoff nozzles as indicated in FIG. 4.

As seen in FIG. 5 of the drawings, an exemplary bearing is shown in dotted lines having an inner race 48 and an outer race 50, the latter being supported at diametrically opposite portions by the bearing support means of the conveyor or more specifically by the conveyor chains previously indicated as 12. In this manner, the inner race 48 of each bearing is suspended in a disposition enabling it to rotate during conveyance through the housing of the washing machine. Also, as seen in FIG. 5 the inner race may project both above and below the outer race.

As seen in FIGS. 3 and 5, each conveyor mount 39 and 40 includes three similar portions spaced along the length of the bearing support means 12. Each conveyor mount includes a low friction substance 52, such as Teflon, for the bearing support means to ride on. The bottom portions 54 and 56 of each conveyor mount are disposed or carried on oppositely threaded portions 58 and 60 of a conveyor mounts shaft 62. Guide rails 64 and 66 are respectively disposed on the upper portions of respective conveyor mounts 39 and 40 by guide rail shafts 68 and 70. Each guide rail shaft is in turn connected through miter gears 72 and 74 to a single shaft 76. When FIGS. 4 and 5 are taken together, it is to be understood that the three portions of each conveyor mount 39 and 40 are substantially identical and that the three conveyor mounts shafts 62 are mechanically connected one to another by a single shaft and worm gear assembly 78 as seen in FIG. 4. In addition, the three shafts 76 which mechanically tie the corresponding guide rail shafts of each conveyor mount portion together are in turn mechanically coupled one to another by a shaft and worm gear assembly shown as 80 in FIG. 4.

As shown further in FIG. 5 of the drawings a high pressure air blowoff hose and nozzle structure 44 is attached to the uppermost portion of the guide rail 66. The high pressure air hose 44 is in turn connected to an appropriate external source of "shop" air. The nozzle portion 45 of the high pressure air assembly thereby assumes a fixed relation to the guide rail 66 and necessarily the outer peripheral edge of a typically supported outer race 50 regardless of the specific diameter of such outer race 50 as shown in FIG. 5. The washing section previously designated as 42 in FIGS. 3 and 4 and the nozzles associated therewith assume the same type of structure as the high pressure air hose and nozzle 44 and 45. The nozzle employed in the washing and blowoff sections is shown in detail in FIG. 7. As shown therein, a plurality of relatively small diameter ports 82 direct a flow of washing solution or high pressure air, as the case may be, in a downwardly oblique direction. As further depicted in FIG. 9 of the drawings, the washing nozzles 42 are oriented with respect to the ports 82 to impinge on the inner races of bearings being conveyed on block chains 12 so as to additively urge each such inner race into rotation. In addition, the nozzle structure 45, disposed on one side only of the bearings being processed, is oriented in the same direction as the washing nozzle 42 with which it is aligned.

FIG. 6 shows a cross sectional view of the low pressure drying air hoses 46 and the low pressure plenum and nozzle structure 47 associated therewith. As shown in FIG. 8, the low pressure nozzle 47 includes a plurality of ports 84 having diameters which are relatively larger than the diameters of ports 82 in the washing and blowoff nozzles. As further depicted in FIG. 9, the low pressure plenum and nozzle assemblies 47 are aligned with the washing and blowoff nozzles and are disposed or oriented so as to impart further rotation to the inner race of each processed bearing. As indicated in FIG. 9, such rotation imparted is a mere continuation of the rotation initiated in the washing and blowoff sections of the washing machine. The quantity of drying air, and consequently the degree of dryness of the processed bearings can be selectively varied by means of suitable control valves in each line 46, as indicated at 91 in FIG. 4.

In operation of the washing machine, the width between the block chains 12 is adjusted to correspond to the diameter of the outer race 50 of the bearings to be processed. In turn the spacing between the guide rails 66 and the block chains 12 is adjusted to accommodate the thickness of the outer race 50. Such adjustments are provided for respectively by the previously described conveyor mounts shafts 62 and guide rail shafts 70. One of the adjustment handles 86 shown in FIG. 1 is rotatably connected to the worm gear linkage 78 shown in FIG. 4. Upon rotation of worm gear 78 in one direction, gears 88 will rotate in a corresponding direction and thereby effect rotation of the conveyor mounts shafts 62. As shown in FIG. 5, the oppositely threaded portions 58 and 60 of each conveyor mounts shaft will provide for simultaneous movement of the conveyor mounts 54 and 56 towards and away from one another in equal proportions.

In similar fashion, the second adjustment wheel 86 is rotatably connected to the worm gear linkage 80 which in turn provides corresponding rotation to gears 90. The gears 90 in turn provide rotation to shafts 76 shown in FIG. 5 and the miter gears 72 and 74 associated therewith. Rotation of the miter gears drives the guide rail shafts 68 and 70 into corresponding rotation. The lower portions of the guide rail shafts 68 and 70 are disposed within apertures in conveyor mounts 39 and 40 and are anchored therein with respect to horizontal movement of the conveyor mounts. Such horizontal movement of the guide rail shafts is possible since the miter gears 72 and 74 are free to slide on shaft 76. The guide rail shafts are free to rotate within the conveyor mount apertures and thereby impart vertical adjustment to the guide rails 64 and 66.

Once the spacing of the block chains 12 and guide rails 64 and 66 have been effected, uncleaned bearings are fed into the left hand end of the washing machine as shown in FIG. 1. The bearings are conveyed upwardly to the right and pass sequentially beneath the washing nozzles 42, the high pressure air blowoff nozzles 45, and the drying nozzles 47. The orientation of the various nozzles imparts a continuous rotation to the inner race of each bearing and the downward component of force in each nozzle flow impinges on the bearings to increase the frictional engagement between the bearings and the block chains 12 so as to assure proper conveyance of the bearings through the washing machine. After conveyance underneath the low pressure drying nozzles 47, the bearings are received at the righthand end of the machine shown in FIG. 1 in a fully processed condition.

From the foregoing, it is apparent that the objects of the present invention have been fully accomplished. As a result of this invention, a bearing washing machine is provided for washing and drying a quantity of bearings in a continuous manner while minimizing the amount of manual labor required once the machine has been put into operation.

The term roller means as used in the claims is intended to encompass any geometric shape.

I claim:

1. A bearing washing machine for washing and cleaning bearings, each such bearing having an inner and outer race with a plurality of roller means disposed therebetween, and wherein the bearings can be continuously fed into said washing machine and processed thereby, said bearing washing machine comprising:
    a housing;
    conveyor means for conveying bearings through said housing, said conveyor means having two spaced, substantially parallel bearing support means for supportably conveying diametrically opposite portions of each said outer race means so that each respective inner race means is rotatable during conveyance of each bearing through said housing;
    conveyor drive means, said drive means being in driving connection with said conveyor means for driving said conveyor means through said housing, and;
    a plurality of fluid nozzles being disposed adjacent to said bearing support means, said fluid nozzles being so disposed for directing a corresponding plurality of fluid flows onto said bearings upon conveyance of said bearings past said nozzles.

2. A bearing washing machine according to claim 1 further including two conveyor mounts on which said two bearing support means are correspondingly mounted, each said bearing support means being slidable on its respective conveyor mount and means for selectively spacing said conveyor mounts one from another so as to correspondingly vary the spacing of said bearing support means in order to supportably convey bearings having different diameters.

3. A bearing washing machine according to claim 2 wherein said conveyor mounts are disposed on a conveyor mounts shaft with each said conveyor mount engaging oppositely threaded portions thereof so that said conveyor mounts proportionally translate towards and away from one another upon corresponding rotation of said conveyor mounts shaft.

4. A bearing washing machine according to claim 2 wherein each said bearing support means comprises an endless chain.

5. A bearing washing machine according to claim 1 wherein said fluid nozzles are disposed to tangentially impinge on each said inner race and urge each said inner race into rotation.

6. A bearing washing machine according to claim 5 wherein said fluid nozzles are further disposed to impinge on each said bearing means so as to urge each said bearing means into contact with said conveyor means.

7. A bearing washing machine according to claim 1 further including means to retain bearings in lateral alignment with said conveyor means.

8. A bearing washing machine for washing and cleaning bearings, each such bearing having an inner and outer race with a plurality of roller means disposed therebetween and wherein the bearings can be continuously fed into said washing machine and processed thereby, said bearing washing machine comprising:
    a housing; conveyor means for conveying bearings through said housing, said conveyor means having two spaced, substantially parallel bearing support means for supportably conveying diametrically opposite portions of each said outer race means so that each respective inner race means is rotatable during conveyance of each bearing through said housing;
    two conveyor mounts on which said two bearing support means are correspondingly mounted, each said bearing support means being slidable on its respective conveyor mount and means for selectively spacing said conveyor mounts one from another so as to correspondingly vary the spacing of said bearing support means in order to supportably convey bearings having different diameters;
    conveyor drive means, said drive means being in driving connection with said conveyor means for driving said conveyor means through said housing;
    one guide rail disposed on one conveyor mount, and means for selectively spacing said guide rail from said bearing support means in order to retain bearings of different thicknesses in aligned contact with said bearing support means; and
    a plurality of fluid nozzles being disposed adjacent to said bearing support means, said fluid nozzles being so disposed for directing a corresponding plurality of fluid flows onto said bearings upon conveyance of said bearings past said nozzles.

9. A bearing washing machine according to claim 8 wherein said conveyor mounts are disposed on a conveyor mounts shaft with each said conveyor mount engaging oppositely threaded portions thereof so that said conveyor mounts proportionally translate towards and away from one another upon corresponding rotation of said conveyor mounts shaft.

10. A bearing washing machine according to claim 8 including a second guide rail on a second conveyor mount wherein each said guide rail is mounted on its respective conveyor mount by a guide rail shaft with each said guide rail shaft being anchored to its respective conveyor mount, and guide rail linkage for interconnecting and simultaneously adjusting said guide rails along their respective guide rail shafts to positions of substantially equal spacing from corresponding said bearing support means.

11. A bearing washing machine according to claim 8 wherein each said bearing support means comprises an endless chain.

12. A bearing washing machine according to claim 8 wherein said fluid nozzles are disposed to tangentially impinge on each said inner race and urge each said inner race into rotation.

13. A bearing washing machine according to claim 12 wherein said fluid nozzles are further disposed to impinge on each said bearing means so as to urge each said bearing means into contact with said conveyor means.

* * * * *